G. B. REINISH ET AL 2,716,236

APPARATUS FOR PRECISION TIME INTERVAL MEASUREMENT

Filed Feb. 24, 1949

INVENTORS
CHARLES E. O'TOOLE
GLORIA B. REINISH
BY
Herbert W. Thompson
their ATTORNEY.

United States Patent Office 2,716,236
Patented Aug. 23, 1955

2,716,236

APPARATUS FOR PRECISION TIME INTERVAL MEASUREMENT

Gloria Brooks Reinish, Brooklyn, and Charles E. O'Toole, Flushing, N. Y., assignors to Sperry Rand Corporation, a corporation of Delaware Application February 24, 1949, Serial No. 78,082

26 Claims. (Cl. 343—13)

This invention relates to pulse radar ranging systems and particularly to apparatus for generating an electric pulse which is delayed a precise time interval after the occurrence of a reference pulse.

In conventional range pulse generators the range pulses are generated by producing pulses corresponding in frequency to the frequency of a sine wave signal which is derived from a sine wave generator through a phase shifter. These pulses are combined with a pedestal which is caused to occur at the same time as one of the pulses, and the combined output is employed to generate a pulse which occurs when the pedestal coincides with a pulse. The delay time of the range pulse generator is accomplished by adjusting the phase shifter and the timing circuit for the pedestal generator simultaneously. Ordinarily the phase shifter comprises an adjustable condenser or inductor whose capacitance or inductance is varied over a predetermined range in accordance with the angular position of a control shaft. A disadvantage inherent in this type range pulse generator is that the range indicator and control apparatus which determine phase shift introduced must be located near the phase shifter or interconnected therewith by a complicated means, such as a servo system. Also, such systems are subject to cyclic and transient errors as well as being difficult to adjust and synchronize.

It is an object of this invention to provide improved apparatus for generating an electric pulse which is delayed a precise time interval after the occurrence of a reference or starting pulse.

An additional object of this invention is to provide an improved system for continuous, precision ranging which is easy to adjust and operate.

A further object of this invention is to provide a system for ranging in which the range indicator and its associated mechanism may be located a distance from the apparatus for time interval measurement, and in which the range indicator and the apparatus for time interval measurement may be interconnected by a simple electrical system.

Further objects and advantages of the invention will be apparent from the following description, the appended claims, and the drawings, in which.

The objects of this invention are attained by employing three linear potentiometers whose rotors are mechanically connected to a range indicator. A train of pulses (rather than sine waves as used in conventional generators) is employed as the primary timing reference. A starting pulse serves to cause a transmitter to radiate a pulse of electromagnetic energy and to initiate the train of pulses and a long linear voltage excursion whose duration corresponds to the maximum delay time to be measured. The long voltage excursion is compared to the voltage produced by one of the linear potentiometers, and a gate pulse is produced as soon as the magnitude of the voltage of the long excursion exceeds the voltage produced by the potentiometer. This gate pulse is a rough measure of the range and is employed to gate either one or two pulses of the train. Each gated pulse serves to initiate a short, linear voltage excursion, and each of these short excursions is compared with the voltage produced by one of the other two potentiometers. As soon as the magnitude of the voltage of either of the short excursions exceeds the voltage produced by the respective potentiometer, a final range pulse is generated. This final range pulse may be applied to the deflection plates of a cathode-ray tube and may be brought into coincidence with a pulse representing the time delay or range to be measured by the simultaneous adjustment of the angular displacement of the rotors of the three potentiometers. The movement of the rotors of the potentiometers is synchronized so that when two pulses of the train are gated, the two range pulses which are generated occur at substantially the same time.

In the discussion of the preferred embodiment of this invention which follows, frequent reference will be made to Fig. 7 which indicates the wave form of and the time relations between the various electric signals which occur in the apparatus disclosed in Fig. 1. It should be observed that the letter which identifies each curve in Fig. 7 also identifies the connection in the block diagram of Fig. 1 which carries the corresponding electric signal.

Figure 1:
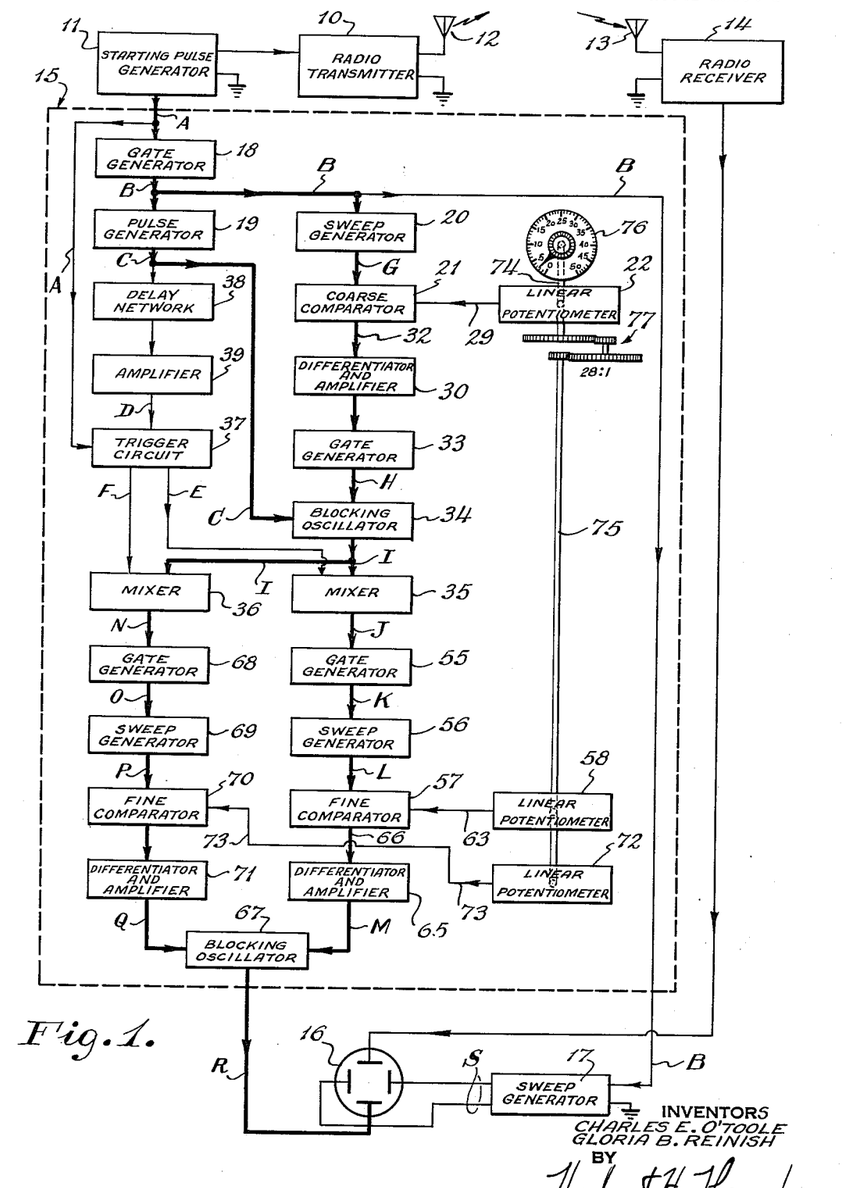
Fig. 1 is a block diagram indicating a ranging system employing the range pulse generator.

Referring now particularly to Fig. 1, there is disclosed an application of the range pulse generator to a range indicating system in which pulses of high frequency electromagnetic energy are produced by transmitter 10 in response to recurrent starting pulses produced by generator 11. These high frequency pulses are radiated by antenna 12 to the object whose distance from the antenna is to be determined, and the electromagnetic pulses reflected from the object are received by antenna 13 and detected by receiver 14. Antennas 12 and 13 are preferably directive so that the direction as well as the distance of the object to be located may be determined. If desired, a single antenna may be employed for both transmitting and receiving by using a suitable duplexing arrangement to isolate the transmitter and receiver in accordance with well-known principles.

Figure 7:
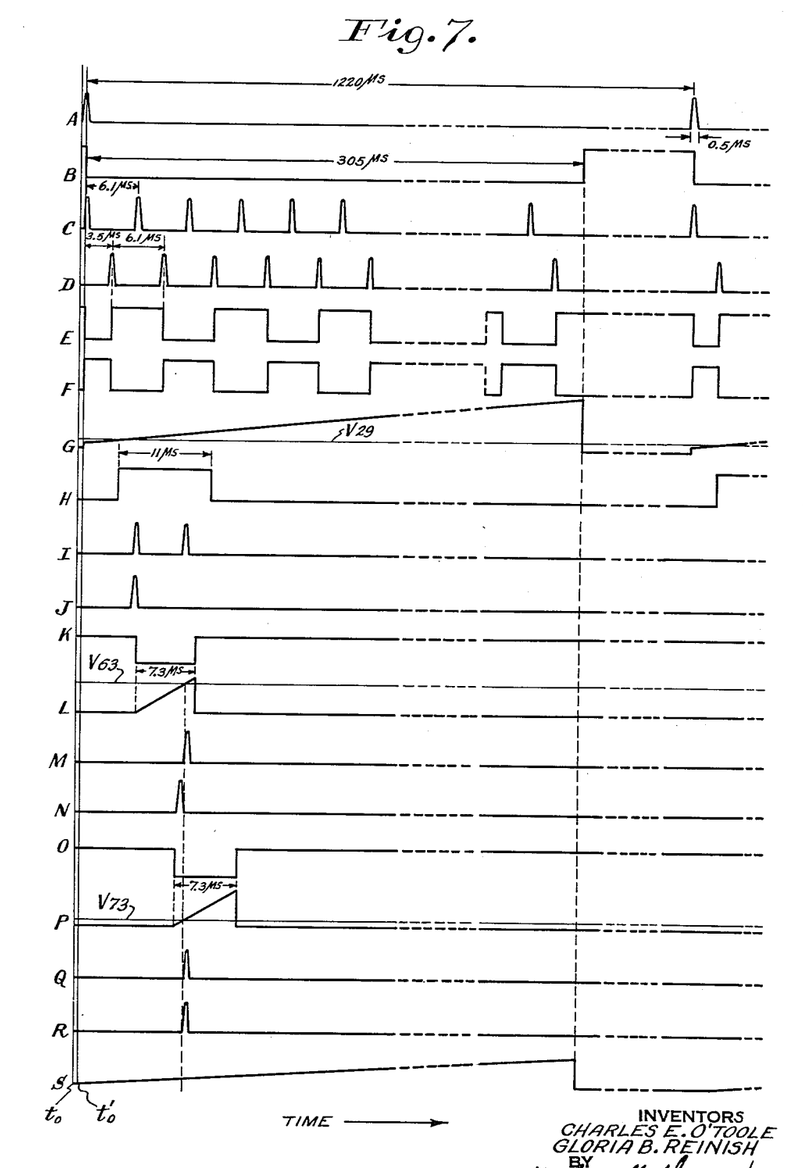
Fig. 7 indicates various curves representing the wave form of and time relationship between signals which occur in various parts of the ranging system disclosed in Fig. 1.

Starting pulse generator 11 which may be of conventional design, produces electric pulses as indicated at A in Fig. 7. These pulses are recurrent and may or may not be periodical; however, the minimum period between pulses must be greater than the maximum delay time to be measured in each instance. The recurrence frequency and the duration of the reference pulses must be determined in accordance with well-known principles by considering the operating conditions to which the ranging system is to be applied. In this embodiment of the invention a recurrence period of 1220 microseconds and a reference pulse duration of approximately one-half microsecond is employed; however, it will be apparent that this invention is equally applicable to ranging systems which require a different recurrence period and reference pulse duration.

The starting pulses are applied to transmitter 10 which in turn causes antenna 12 to radiate a pulse of electromagnetic energy. The starting pulses are also applied to range pulse generator 15 which in response thereto produces range pulses, as indicated at R in Fig. 7, that are delayed from the starting pulses A by a time determined by the setting of the three linear potentiometers as will be explained in detail hereinafter. The range pulses and the reflected pulse output or receiver 14 are applied to the vertical deflection plates of cathode-ray tube 16. Sweep generator 17 is also actuated by the starting pulses and serves to generate a sweep voltage S, Fig. 7, which is applied to the horizontal deflection plates of cathode-ray tube 16. Since this sweep voltage is initiated by the starting pulses, the representations of the pulses produced by the pulse generator 15 and receiver 13 are stabilized on the screen of the cathode-ray tube. Generator 15 may be adjusted to cause the representations of the two pulses to coincide on the screen of the cathode-ray tube, and when the two representations of pulses do coincide, the time delay introduced by generator 15 is equal to the sum of the time required for the high frequency electromagnetic pulse to travel from antenna 12 to the object to be located and the time required for the reflected high frequency electromagnetic pulse to travel from the object to antenna 13. Provision is made in generator 15 for precisely indicating the delay time for the range pulse in terms of the distance between the radar station including antennas 12 and 13 and the object which produces the reflected wave.

If desired, the range pulses produced by generator 15 may be employed with the echo pulse representations produced by receiver 14 to control an automatic ranging system of conventional design for automatically controlling the angular position of the three linear potentiometers of generator 15 and thereby cause the pulses produced by of generator 15 to occur at substantially the same time as the echo pulses. In such an arrangement, the angular position of the rotors of the three linear potentiometers of generator 15 is controlled by the automatic ranging system through a suitable actuating means such as a servo system.

It is known that echo delay time of 6.1 microseconds corresponds to a distance of approximately 1000 yards between the reflecting object and the antennas in an electromagnetic pulse ranging system. This embodiment of the invention is adapted to measure delay times from 6.1 microseconds to 305 microseconds corresponding to a distance R between the reflecting object and the antennas of from 1000 to 50,000 yards. A slight modification will permit ranging from 0 to 50,000 yards, as will be explained hereinafter.

Continuing now with reference to Figs. 1 and 7, the starting pulses A are applied to gate generator 18 and cause generator 18 to produce a negative gate B which in turn is applied to pulse generator 19 and sweep generators 17 and 20. The negative gate produced by generator 18 is of a duration equal to the maximum delay time to be measured—305 microseconds in the embodiment indicated. There is a small delay between the time when each pulse A is initiated and the time when generator 18 and the other circuit components respond. This delay equals the difference between times $t_0'$ and time $t_0$ as shown in Fig. 7.

Generator 18 may be a conventional gate generator such as a "one shot" multivibrator.

Pulse generator 19 may be a conventional generator adapted to produce a train of steep wave-front pulses at a constant recurrence frequency, the number of pulses being determined by the duration of gate B. In the embodiment shown, generator 19 produces 50 pulses occurring at 6.1 microsecond intervals of time.

An alternative method of obtaining pulses A and C in correct time relationship is to continuously activate the generator of pulses C and employ a conventional divider circuit in conjunction with the generator to produce pulses A. With this arrangement one pulse A is generated in response to a predetermined number of pulses C, as for example 200 pulses for the repetition rate employed in the embodiment of the invention disclosed herein. The generator of pulses A is employed to activate the radio transmitter and the generator of gates B while the output of the generator of pulses C is applied to blocking oscillator 34 and delay network 38 as before.

Sweep generator 17 may be any conventional type sweep generator adapted to generate a voltage excursion whose magnitude increases in a substantially linear manner with respect to time. The duration of the sweep excurion S is equal to the duration of gate B.

Sweep generator 20 serves to generate a voltage excursion G which initially has a voltage step and then increases in a substantially linear manner with respect to time. The deviations from linearity for excursion G should be very small in order to obtain satisfactory range tracking. Such accuracy in linearity can be obtained by employing a special sweep circuit such as the well-known "bootstrap" type. When generator 20 is actuated by gate B at time $t_0'$, the voltage produced by generator 20 instantly changes from zero to a few volts, such as 2.7 volts for example, and then the voltage increases in a linear manner as indicated at G in Fig. 7. This initial change in voltage may be obtained by properly proportioning the circuit constants of the sweep circuit.

Sweep excursion G is applied to coarse comparator 21 where the instantaneous magnitude of the voltage excursion is compared with the magnitude of adjustable voltage $V_{29}$ derived from linear potentiometer 22 in order to produce a pulse at the instant when the magnitude of the voltage excursion exceeds voltage $V_{29}$ derived from potentiometer 22.

Figure 2:
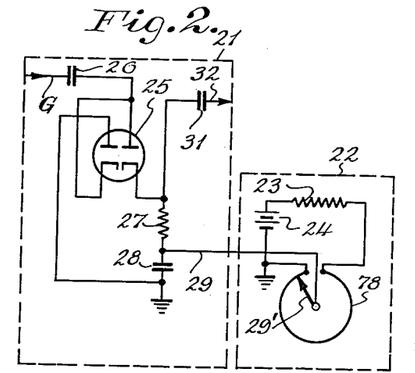
Fig. 2 is a schematic diagram of the coarse comparator and linear potentiometer disclosed in Fig. 1 in block diagramatic form.

Fig. 2 shows a schematic diagram of a suitable comparator 21 and linear potentiometer 22. The comparator 21 comprises a twin-diode vacuum tube 25, whose right half is connected between coupling condenser 26 and serially connected cathode resistor 27 and grounded condenser 28. Resistance element 78 of the potentiometer and serially connected resistor 23 are connected across a source of potential 24, and rotor 29' of the potentiometer is connected to the junction between resistor 27 and condenser 28 by conductor 29. The negative terminal of source of potential 24 is grounded. Therefore, potentiometer 22 serves to raise the cathode of the right half of tube 25 to a positive potential with respect to ground.

Resistor 23 serves to control the voltage drop across the potentiometer resistance element 78, and this voltage drop is adjusted so that the voltage $V_{29}$ supplied from the potentiometer to the comparator when the range indicator is set at 50,000 yards equals the voltage of excusion G at time $t_0 + 294$ microseconds.

When the right half of tube 25 is non-conducting, the voltage between the plate and cathode of the right half of tube 25 is equal to the difference between the voltage of excursion G at the time under consideration and the voltage $V_{29}$ produced by potentiometer 22.

When the range indicator is set at 1500 yards, potentiometer 22 is adjusted so that the voltage between rotor 29' and ground equals the initial voltage step of excursion G. Thus, when the range indicator is set at less than 1500 yards the voltage of excursion G at time $t_0'$ is more than the voltage $V_{29}$ produced by potentiometer 22 and the plate of the right half of tube 25 is of positive polarity with respect to its cathode. For this condition the right half of the tube conducts current and a surge of current flows from conductor G through condenser 26, tube 25, resistor 27, and condenser 28 to ground. The voltage produced across resistor 27 and condenser 28 as a result of this surge of current is applied to differentiator and amplifier 30 through condenser 31 and conductor 32.

When the range indicator is set at more than 1500 yards, the voltage $V_{29}$ supplied by linear potentiometer 22 is more than the initial step of excursion G. For this condition, the plate of the right half of tube 25 is initially of negative polarity with respect to its cathode and the tube is non-conducting. At a time between $t_0'$ and $t_0'+294$ microseconds when the voltage of excursion G exceeds voltage $V_{29}$ supplied by potentiometer 22 the right half of tube 25 will conduct current and a pulse will be produced.

The cathode of the left half of tube 25 is connected to the plate of the right half of the tube and the plate of the left half is grounded so that the left half of the tube serves to discharge condenser 26.

The pulse thus produced by coarse comparator 21 is converted to a steep wave-front pulse and amplified in a conventional manner by differentiator and amplifier 30, and the resulting pulse is applied to gate generator 33. This generator may be a conventional "one shot" multivibrator. It is adjusted so that the positive gate H generated thereby is of a duration greater than but less than twice the period between pulses C.

Gate H is applied to blocking oscillator 34 which may be of conventional design, and the gate serves to condition oscillator 34 so that it will respond to any of the pulses C which occur during the period of the gate. It will be observed that gate H is of such duration that it will serve to condition blocking oscillator 34 to respond to either one or two of the pulses C since the duration of gate H is greater than but less than twice the period between pulses C. If gate H occurs at a time during which one of the pulses C occurs, one pulse will be produced at the output I of oscillator 32. However, if the gate occurs at a time during which two of the pulses C occur, two pulses will appear at output I as illustrated in Fig. 7.

Output I of oscillator 34 is applied to mixers 35 and 36, and the response of these mixers is controlled by trigger circuit 37 so that mixer 35 responds to each even pulse and mixer 36 responds to each odd pulse of train C which is reproduced at I. This trigger circuit has two equilibrium conditions and can be caused to shift from one of these conditions to the other by the application of a pulse. The trigger circuit may by a "flip-flop" circuit as indicated in Fig. 3, for example.

The pulses which control the equilibrium condition of trigger circuit 37 are obtained from generator 19 through delay network 38 and amplifier 39. The pulses C produced by generator 19 appear approximately 3 microseconds later at the output D of amplifier 39. Network 38 may be a conventional delay network composed of lumped impedances, for example, and amplifier 39 is a conventional vacuum tube amplifier designed to restore the resistive losses introduced by network 38.

Figure 3:
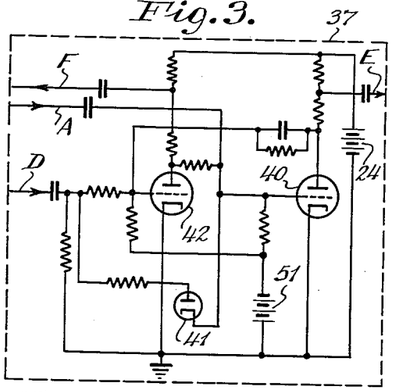
Fig. 3 is a schematic diagram of the trigger circuit disclosed in Fig. 1 in block diagramatic form.

Fig. 3 shows a conventional "flip-flop" trigger circuit 37 which has been modified by the insertion of a diode 41 in the circuit between the grids of the two trigger tubes 40 and 42. The pulses D which control the equilibrium conditions of trigger circuit 37 are applied between conductor D and ground. The starting pulses A are applied between conductor A and ground, and these pulses serve to establish the initial condition of the trigger circuit by causing vacuum tube 40 to be conducting before the arrival of the pulse train D. Diode 41 serves to interconnect the control grids of tubes 40 and 42, and since diode 41 is a unilateral conductor the positive starting pulses A are applied only between the control grid of tube 40 and ground and never reach the control grid of tube 42. Since diode 41 offers a low impedance to the pulses of train D which cause the plate of the diode to be of positive polarity with respect to the cathode, these pulses are applied to the control grids of both tubes 40 and 42. Thus, the first pulse of train of pulses D always causes tube 42 to be conducting and tube 40 to be non-conducting, and each successive pulse reverses the condition of the two trigger tubes.

It will be apparent that other means may be employed for establishing the initial condition of the trigger circuit. For example, an unbalanced "flip-flop" circuit could be employed.

Figure 4:
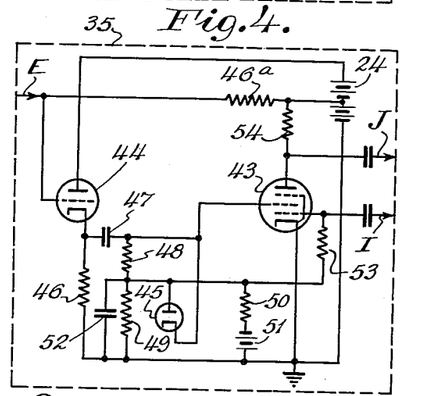
Fig. 4 is a schematic diagram of one of the mixer circuits disclosed in Fig. 1 in block diagramatic form.

The outputs E and F of trigger circuit 37 are connected to two identical mixers 35 and 36 such as the mixer 35 shown in Fig. 4.

Referring now particularly to Fig. 4 where mixer 35 and the conductor E interconnecting the mixer with the trigger circuit is shown, the apparatus indicated is adapted to reproduce at J pulses I as applied between the control grid and cathode of a sharp-cutoff pentode tube 43 only during the interval of time during which a positive gate is applied between conductor E and ground by trigger circuit 37.

Triode tube 44 serves as a cathode follower and is employed to prevent voltages developed across clamper diode 45 from upsetting trigger circuit 37. Resistor 46a serves to connect the control grid of tube 44 to a positive terminal of battery 24. The circuit constants are proportioned so that the wave form of the voltage pulses which result from the voltage drop across resistor 46 is substantially the same as the wave form of gates E derived from trigger circuit 37.

The screen grid of tube 43 is coupled to the cathode of tube 44 through condenser 47, which in combination with resistor 48 and diode 45 forms a clamper circuit. The resistance of resistor 48 and the capacitance of condenser 47 are proportioned so that the time constant of these two serially connected elements is much greater than the duration of each of the pulses E, and as a result, the wave form of the voltage developed across resistor 48 is the same as the wave form of pulses E and substantially the entire voltage of each square wave voltage pulse developed across resistor 46 is developed across resistor 48. The magnitude of the voltage developed across resistor 48 is zero during the intervals of time in which the voltage of pulses E is a minimum, and it increases rapidly to a large positive value, as to 100 volts for example, during the intervals of time in which the voltage of pulses E is a maximum.

Resistors 49 and 50 are connected across source of potential 51 and serve as a voltage divider. Condenser 52 serves as a low impedance path between the plate of tube 45 and ground so that the square wave pulses developed across resistor 46 are applied across the clamper circuit with very little attenuation. These circuit elements are proportioned so that a small negative voltage, as 14 volts for example, appears across resistor 49. This negative voltage is applied to the screen grid of tube 43 through resistor 48, and when no voltage is developed across resistor 48 of the clamper circuit, substantially the entire negative voltage appears between the screen grid and cathode of tube 43, thereby rendering tube 43 inoperative to reproduce any signals which may be impressed upon its control grid. When voltage is developed across resistor 48 of the clamper circuit, the voltage which appears between the screen grid and cathode of tube 43 is the difference in voltage between the voltages across resistors 48 and 49. This voltage is of positive polarity and sufficient magnitude, as 86 volts for example, to permit tube 43 to reproduce at J any signals which may be impressed upon its control grid.

The voltage developed across resistor 49 as a result of the voltage divider action of resistors 49 and 50 is applied to the control grid of tube 43 through resistor 53 which is of high resistance. This voltage serves to bias sharp-cutoff pentode tube 43 to cutoff so that substantially no plate current flows. When pulses I are applied between the control grid and cathode of tube 43, each pulse instantaneously reduces or removes the grid bias and a pulse of current flows from source of potential 24, through plate resistor 54 and the interelectrode space between the plate and cathode of tube 43 to ground, provided the screen grid of tube 43 is of positive polarity with respect to its cathode.

Since each gate pulse E is of a duration equal to the period between pulses D, it is apparent from an inspection of the curves of Fig. 7 that mixer 35 will be activated during a time which will allow it to reproduce at J only the even numbered pulses I which are derived from the blocking oscillator. Since mixer 36 is activated by each of the positive gate pulses F, it can reproduce at N only the odd numbered pulses I which are derived from the blocking oscillator.

It will be observed that the plate current of tube 43 is extinguished by the cutoff bias applied to the control grid of tube 43 except for the duration of each pulse I, therefore, no pulses are produced at J as a result of the sudden changes in screen grid voltage.

It will be apparent to one skilled in the art that the amplifying condition of tube 43 may be controlled in other ways. For example, the voltage applied to the suppressor grid could be varied in accordance with the gate pulses generated by trigger generator 37 so that the suppressor grid of tube 43 is of negative polarity with respect to its cathode during the troughs of gate pulses E and so that the suppressor is of positive polarity with respect to its cathode during the peaks of gate pulses E.

The output pulses J produced by mixer 35 are applied to gate generator 55, and generator 55 serves to generate a negative gate K which is of a duration approximately 20% greater than the period between pulses C. This generator may be a conventional "one-shot" multivibrator for example. Gate K is applied to sweep generator 56 and causes generator 56 to produce a voltage excursion L which is substantially linear and of the same duration as gate K. The deviations from linearity for the voltage excursion should be very small in order to obtain satisfactory ranging accuracy. Linearity of this order of accuracy may be obtained with a "bootstrap" circuit as discussed with reference to sweep generator 20. However, the circuit constants of generator 56 should be proportioned so that the voltage excursion starts from substantially zero volts instead of beginning with an initial step of a few volts as discussed with reference to generator 20.

Voltage excursion L is applied to a fine comparator 57 where the instantaneous magnitude of the voltage excursion is compared with a voltage derived from linear potentiometer 58 in a manner similar to that described for coarse comparator 21 and linear potentiometer 22.

Figure 5:
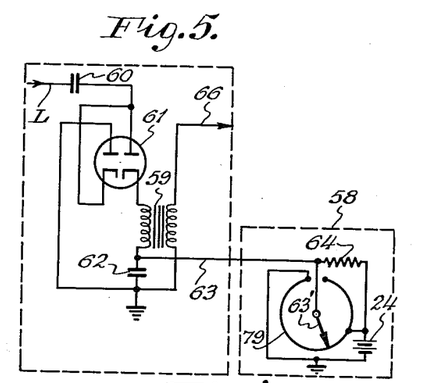
Fig. 5 is a schematic diagram of one of the fine comparators and linear potentiometers disclosed in Fig. 1 in block diagramatic form.

Referring now particularly to Fig. 5 where fine comparator 57 and linear potentiometer 58 are indicated in schematic form, it will be observed that the fine comparator is the same as the coarse comparator with the exception that a pulse transformer 59 has been substituted for resistor 27 and condenser 31. A pulse transformer is employed in the fine comparator since the pulse produced by this comparator should have a very steep wave-front. Sweep excursion L is applied across serially connected condenser 60, the interelectrode space between the plate and cathode of the right half of twin-diode 61, the primary winding of pulse transformer 59, and condenser 62. A portion of resistance element 79 of potentiometer 58 is connected across battery 24 and the rotor 63' of the potentiometer serves to apply an adjustable positive voltage to the cathode of the right half of tube 61 over conductor 63. Resistor 64 is connected between rotor 63' and the positive terminal of battery 24 so that rotor 63' is maintained at a fixed potential when it is not in contact with resistance element 79.

When a voltage excursion is introduced over conductor L, it serves to change the voltage between the plate and cathode of the right half of tube 61 in a linear manner. Initially the cathode is of positive polarity with respect to the plate due to the voltage supplied by potentiometer 58, and the tube is non-conducting. However, as soon as the voltage of the voltage excursion is of sufficient magnitude to cause the plate of the right half of tube 61 to be of positive polarity with respect to its cathode, a pulse of current flows from conductor L through condenser 60, tube 61, the primary winding of transformer 59 and condenser 62 to ground. As a result, a steep wave-front pulse of voltage appears across the secondary of transformer 59, and this pulse is applied to differentiator and amplifier 65 over conductor 66. The pulse is differentiated and amplified in a conventional manner and the resulting pulse M is applied to blocking oscillator 67.

Blocking oscillator 67 is a conventional type adapted to produce a sharp pulse representing one half cycle of the natural frequency of the oscillator in response to an electric pulse.

Mixer 36 is identical to mixer 35 and is connected to trigger circuit 37 by conductor F. Each positive gate pulse F serves to activate mixer 36 during a time which will allow the mixer to reproduce at N only the odd numbered pulses I which are applied to the mixer from oscillator 34.

Gate generator 68, the sweep generator 69, fine comparator 70, and differentiator and amplifier 71 are similar to gate generator 55, sweep generator 56, fine comparator 57, and differentiator and amplifier 65; respectively. Output N of mixer 36 causes gate generator 68 to produce gate O which in turn causes sweep generator 69 to produce a voltage excursion P, and voltage excursion P is compared to an adjustable voltage $V_{73}$ derived from linear potentiometer 72 over conductor 73 to produce differentiated pulse Q in the same manner as the similar functions were performed by the channel associated with mixer 35. Each pulse Q causes blocking oscillator 67 to produce a pulse R as indicated in Fig. 7.

Pulses M and Q may be applied directly to the vertical deflection plates of cathode-ray tube 16 rather than through blocking oscillator 67 to the deflection plates. The purpose of blocking oscillator 67 is to provide a cleaner output pulse during the periods when pulses M and Q occur simultaneously.

Figure 6:
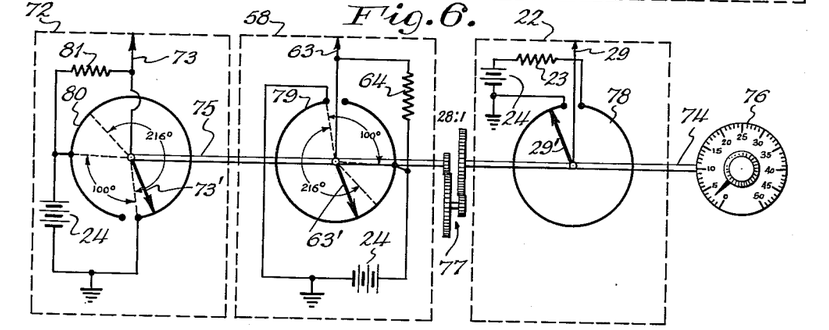
Fig. 6 is a schematic diagram of the three linear potentiometers disclosed in Fig. 1 in block diagramatic form in which the range indicator and the method of connecting the three potentiometers with the range indicator is indicated.

Referring now particularly to Fig. 6 where a schematic diagram of the three linear potentiometers is shown, it will be observed that the rotors of the three potentiometers are coupled by shafts 74 and 75 which are controlled by range indicator 76. Gears 77 couple shaft 74 with shaft 75, so that shaft 75 rotates 28 times for each rotation of shaft 74. Thus, the position of the three rotors 29', 63' and 73' is controlled by positioning the knob on indicator 76, and the angular position of the knob indicates the range in yards.

The resistance element 78 of potentiometer 22 extends almost 360° around shaft 74 and the resistance of the element increases in a linear manner around the circumference of the element. Resistor 23 connects battery 24 across element 78 and its resistance is adjusted as discussed above with reference to comparator 21.

The resistance elements 79 and 80 of potentiometers 58 and 72 are identical. Each extends almost 360° around shaft 75 and the resistance of each element increases in a linear manner around the circumference of the element. Source of potential 24 is connected across a portion of each of resistance elements 79 and 80 so that the voltage drop across 216° of each of the elements extending from the grounded terminal of the potentiometer is just equal to the maximum voltage produced by the voltage excursion with which it is compared. For example, if the maximum voltage produced by each short voltage excursion is 250 volts and the potential of battery 24 is 300 volts, battery 24 should be connected across 260° of the potentiometer as indicated in Fig. 6.

The two rotors 63' and 73' are 180° out of phase as they pass over resistance elements 79 and 80 so that there is an overlap of 36° as each rotor passes over the useful 216° portion of its resistance element. Thus, as each of the rotors 63′ and 73′ is passed over the first 36° of rotation from the grounded end of its resistance element, the other rotor is passed over the portion of its resistance element which is between 180° and 216° from the grounded end of the element.

In this embodiment of the invention the overlap of potentiometers 58 and 72 is 20% which corresponds to the 20% overlap in the voltage excursions L and P when two pulses I are gated by gate H as indicated in Fig. 7. In this manner continuous ranging is possible since one or both the fine comparators is always activated.

The voltages which appear on rotors 63′ and 73′ are applied to fine comparators 57 and 70 respectively, where a pulse is produced each time the magnitude of the voltage excursion produced by generator 56 or 69 exceeds the magnitude of the voltage which appears between the respective rotor and ground, as discussed above with reference to the coarse comparator. The voltage which appears on either rotor 63′ or 73′ after the rotor has passed 216° from the grounded end of the associated resistance element always exceeds the maximum value which voltage excursions L and P attain; therefore, a pulse is not produced by the comparator to which this voltage is applied.

Resistors 64 and 81 are of high resistance and serve to maintain the voltage between the rotors and ground at the battery voltage while each rotor passes between the ends of its resistance element. Thus, the potential of each rotor drops abruptly from the voltage of battery 24 to zero when the rotor connects with the grounded terminal of its resistive element.

Correct tracking between potentiometer 22 and potentiometers 58 and 72 takes place when the gate H is caused to straddle two of the pulses of train of pulses C during the 36° portion of the rotation of each potentiometer rotor in which overlap occurs.

It is necessary to make an accurate adjustment of the slope of the two voltage excursions L and P. This may be accomplished by positioning range indicator 76 so that gate H produced by generator 33 causes blocking oscillator 34 to produce two pulses I. Two voltage excursions L and P are produced in response to pulses I and these excursions overlap by about 20%. During the interval of time in which these two excursions overlap, each excursion should change from a magnitude less than to a magnitude greater than the voltage applied to the corresponding fine comparator by the associated linear potentiometer. The slope of the voltage excursion L which is initiated by the earlier pulse is now adjusted until it causes a range pulse M to be produced which coincides with the range pulse Q produced by the later excursion P.

A small fixed delay is inherent in this range generator. This delay may be minimized by designing the various circuits so that the pulses and gates produced have steep wave-fronts. Compensation for the delay is achieved by merely positioning the pointer of indicator 76 on shaft 74 so that a range pulse is generated which corresponds in time exactly to the setting of the pointer.

It will be observed that conductors 29, 63 and 73 may be any length desired, thereby permitting range indicator 76 and the three linear potentiometers to be located at a distance from the rest of the range pulse generator if desired.

In operation, when indicator 76 is set between 1,000 and 1,500 yards range the voltage applied to coarse comparator 21 by potentiometer 22 is less than the initial voltage step of excursion G, and the voltage step causes comparator 21 to produce a pulse and thereby causes generator 33 to produce a gate H which lasts 11 microseconds. This gate H serves to gate blocking oscillator 34 so that it responds to the second pulse of train of pulses C. It is to be observed that gate H does not cause blocking oscillator 34 to respond to the first pulse of train of pulses C because of the slight time-delay introduced by the circuit constants. The second pulse is one of the even pulses, so trigger circuit 37 causes mixer 35 to respond to it, and gate generator 55 is caused to generate a negative gate which is initiated $t'_0+6.1$ microseconds and lasts 7.3 miscroseconds. A short voltage excursion is produced by generator 56, and this voltage excursion is compared with the voltage supplied by potentiometer 58 to produce a range pulse which is delayed from time $t'_0$ by a time which is proportional to the voltage supplied by potentiometer 58. Since the first voltage excursion L occurs between 6.1 and 13.4 microseconds after $t'_0$, it follows that the minimum time at which a reference pulse can be generated is 6.1 microseconds after $t'_0$. Thus, the minimum range which can be determined by this embodiment of the invention is 1,000 yards.

For all ranges over 1,500 yards, the range pulse is caused to occur approxiamtely 9.2 miscroseconds after gate H is initiated since, when both short voltage excursions occur, the range pulses must occur simultaneously during the time when the two excursions overlap.

When indicator 76 is moved between 1,500 yards and 1,700 yards, gate H is caused to move along in range so that when indicator 76 is set at 1,700 yards gate H is initiated at $t'_0+1.2$ microseconds and is terminated at $t'_0+12.2$ microseconds. Thus, the gate straddles only the second pulse of train of pulses C up to this range and thereby causes only one short voltage excursion L to be produced. This excursion is compared with the voltage derived from linear potentiometer 58, and the range pulse which results at R is applied to the vertical deflection plates of cathode-ray tube 16.

When indicator 76 is moved between 1,700 yards and 2,350 yards, gate H straddles the second and third pulse of train of pulses C. (Fig. 7 shows the time relationship of the various pulses and gates when the range indicator is set at approximately 2,100 yards.) These two pulses cause short voltage excursions L and P to be produced by generators 56 and 69 respectively, the even pulse serving to actuate generator 56 and the odd pulse serving to actuate generator 69. Each short voltage excursion is compared with the voltage derived from the corresponding linear potentiometer and a range pulse is generated by each channel during the time that the two excursions overlap. The two range pulses which result occur at the same instant if the electrical characteristics of each channel are identical, and, therefore, blocking oscillator 67 produces only one range pulse at R which is applied to vertical deflection plates of cathode-ray tube 16.

If the electrical characteristics of the two channels are not exactly identical, the two range pulses produced at M and Q will occur at slightly different times. This difference in time is so small that blocking oscillator 67 will respond to only the first pulse which arrives.

When indicator 76 is moved slightly beyond 2,350 yards gate H straddles only the third pulse. Since this is an odd pulse, short voltage excursion P is produced. This excursion is compared with the voltage derived from linear potentiometer 72, and the range pulse which results at R is applied to the vertical plates of cathode-ray tube 16, as before.

And so on in this manner a range pulse may be produced by generator 15 corresponding to any pulse echo range between 1000 and 50,000 yards. In each instance the range pulses are caused to coincide with the reflected pulses detected by the receiver by adjusting the position of the range indicator, and the range to the reflecting object is observed on the range indicator.

It will be apparent to one skilled in the art that various modifications may be made in the apparatus disclosed herein so as to permit the apparatus to measure range distances other than those between 1,000 and 50,000 yards.

To measure ranges down to zero yards, a pre-trigger which occurs a short time before the starting pulses which actuate the transmitter may be employed instead of pulses A to actuate the range pulse generator.

To measure ranges down to only 1,500 yards, the circuit constants of sweep generator 20 may be proportioned so that the voltage excursion G produced by the generator starts from zero volts at time $t'_0$ rather than starting from a small voltage step. In this case the voltage supplied by potentiometer 22 is zero when the range indicator is set at 1,500 yards. Thus, when the range indicator is set at 1,500 yards gate H would start a short time after $t'_0$ and the range mark occurs approximately 9.2 microseconds after gate H is initiated.

To increase the range of the apparatus disclosed herein the number of pulses C may be increased. To further increase the range the time interval between the starting pulses and the interval between the pulses of train C may be increased. In the latter case the duration of the voltage excursions initiated by each pulse must be correspondingly increased.

The error in ranging is largely determined by the linearity of the voltage excursions and potentiometers. In order to obtain greater accuracy at long ranges, several long voltage excursions may be generated and compared in two coarse comparators with voltages derived from two linear potentiometers. The pulse produced by these voltage excursions is then employed to produce a gate H as before. The selection of pulses for initiating the long voltage excursions is then performed by a gate pulse derived from an additional still longer voltage excursion, comparator, and potentiometer. The accuracy required of this voltage excursion to select the correct pulse is low, therefore an extremely long excursion may be employed.

In order to accurately align the range pulse produced by generator 15 with the echo pulse produced by the receiver, two cathode-ray tubes and sweep generators may be employed as is well-known in the art. In this case one cathode-ray tube and sweep generator is employed for coarse adjustment and the other tube and sweep generator is employed for fine adjustment.

Although specific embodiments of this invention have been shown and described, it will be understood that modifications may be made therein without departing from the scope of the invention as defined by the appended claims.

What is claimed is:

1. A pulse timing system comprising an input circuit, means coupled to said input circuit responsive to pulses of a first repetition rate and including an adjustable control device for producing a gate pulse at said first repetition rate adjustably delayed after each of said pulses according to the setting of said adjustable control, means for producing a train of pulses at a repetition rate higher by an appreciable factor than said first repetition rate, said pulse train having a predetermined time relation to said pulses of a first repetition rate and the period between the pulses in said pulse train being shorter than said gate pulses but more than half as long, first and second adjustable sources of potential, movable means adapted to successively and repeatedly change the potential produced by each adjustable source from a first to a second level in a gradual manner as said movable means is displaced, first generating means coupled to said first adjustable source of potential and said control device and responsive to any even pulse of said pulse train which occurs during said gate pulses for producing a reference pulse after a time interval subsequent to said even pulse proportional to the potential produced by said first adjustable source of potential, second generating means coupled to said second source of potential and said control device and responsive to any odd pulse of said pulse train which occurs during said gate pulses for producing a reference pulse after a time interval subsequent to said odd pulse proportional to the potential produced by said second adjustable source of potential, and means for combining the output of said first and second generating means.

2. The apparatus described in claim 1, wherein as said movable means is displaced to cause the potential of one adjustable source to change from said first to said second level, the potential of the other adjustable source reaches said first level at the time that the potential of the one adjustable source reaches said second level and as the potential of the other adjustable source begins to change from said first level to said second level, the potential of the one adjustable source continues to change beyond said second level for a short time during which said reference pulses are caused to occur at substantially the same time when two pulses of said pulse train occur during a gate pulse.

3. The apparatus described in claim 2, wherein said adjustable control device is coupled to and adjusted simultaneously with said movable means.

4. The apparatus described in claim 3, wherein said means for producing a gate pulse comprises a generator coupled to said input circuit adapted to produce a voltage excursion in response to each pulse of the pulses of said first repetition rate, a third adjustable source of potential, and means for comparing said voltage excursion with the voltage of said third, adjustable source of potential and initiating said gate pulse when the voltage excursion changes from a magnitude less than to a magnitude more than the voltage of said third source.

5. A pulse timing system comprising an input circuit, an adjustable control device coupled to said input circuit and responsive to pulses of a first repetition rate for producing a gate pulse at an adjustable time after each of said pulses, means for producing a train of equally spaced pulses, said pulse train having a predetermined time relation to said starting pulses and the period between the pulses in said pulse train being shorter than said gate pulses but more than half as long, first and second adjustable sources of potential, rotatable means adapted to successively change the potential produced by each adjustable source of potential from a first to a second level in a linear manner as said means is rotated, said rotatable means being staggered whereby as the potential of one source is changed from said first to said second level the potential of the other source is changed during a small portion of the initial and final portions of the rotation, first geenrating means coupled to said first adjustable source of potential and said control device and responsive to any even pulse of said pulse train which occurs during said gate pulses for producing a reference pulse after a time interval subsequent to said even pulse proportional to the potential produced by said first adjustable source of potential, second generating means coupled to said second adjustable source of potential and said control device and responsive to any odd pulse of said pulse train which occurs during said gate pulses for producing a reference pulse after a time interval subsequent to said odd pulse proportional to the potential produced by said second adjustable source of potential, and means for combining the output of said first and second generating means.

6. A pulse generator system comprising a generator for producing a starting pulse, a generator for producing a train of equally spaced pulses, said train of pulses having a predetermined time relation to said starting pulse, a generator responsive to said starting pulse for producing a gate pulse at an adjustable time interval after said starting pulse, said gate pulse being of a duration slightly less than twice the time between the pulses of said train of pulses, first and second adjustable sources of potential, movable means for successively and gradually changing said sources of potential from a first to a second level, as said moveable means is displaced, first means coupled to said first adjustable source of potential and said gate pulse generator and responsive to any even pulse of said train of pulses which occurs during said gate pulses for producing a reference pulse after a time interval subsequent to said even pulse proportional to the voltage produced by said first adjustable source of potential, second means coupled to said second adjustable source of potential and said gate pulse generator and responsive to any odd pulse of said train of pulses which occurs during said gate pulse for producing a reference pulse after a time interval subsequent to said odd pulse proportional to the voltage produced by said second adjustable source of potential, and means for combining the output of said first and second means.

7. A range pulse generator system comprising a generator for producing a series of starting pulses, a generator for producing a train of equally spaced pulses, said train of pulses having a predetermined time relation to said starting pulses, a first adjustable source of potential, a generator adapted to produce a gate pulse after a time interval subsequent to each of said starting pulses proportional to the voltage produced by said first source, said gate pulses being of a duration slightly greater than the time between the pulses of said train of pulses, second and third adjustable sources of potential, moveable means for successively and repeatedly changing said sources of potential from a first to a second level in a gradual manner as said moveable means is displaced, a first means coupled to said second adjustable source of potential and said gate pulse generator and responsive to any even pulse of said train of pulses which occurs during said gate pulses for producing a first range pulse after a time interval subsequent to said even pulse proportional to the voltage produced by said second adjustable source of potential, a second means coupled to said third adjustable source of potential and said gate pulse generator and responsive to any odd pulse of said train of pulses which occurs during said gate pulses for producing a second range pulse after a time interval subsequent to said odd pulse proportional to the voltage produced by said third adjustable source of potential, and means for combining the output of said first and second means.

8. The apparatus described in claim 7, wherein as said moveable means is displaced to cause the potential of one of said second and third adjustable sources to change from said first to said second level, the potential of the other adjustable source reaches said first level at the time that the potential of the one adjustable source reaches said second level and as the potential of the other adjustable source begins to change from said first level to said second level, the potential of the one adjustable source continues to change beyond said second level for a short time during which said reference pulses are caused to occur at substantially the same time when two pulses of said pulse train occur during a gate pulse.

9. A range pulse generator system comprising a generator for producing a series of starting pulses, a generator responsive to each of said starting pulses for producing a train of equally spaced pulses, a first source of potential, a first potentiometer coupled to said source of potential and adapted to produce a first control voltage proportional to the angular displacement of the rotor of said potentiometer, a generator coupled to said potentiometer and adapted to produce a gate pulse at a time subsequent to each of said starting pulses proportional to the magnitude of said first control voltage, said gate pulses being of a duration slightly less than twice the time between the pulses of said train of pulses, second and third sources of potential, second and third potentiometers coupled to said second and third sources of potential, mechanical means interconnecting the rotors of said second and third potentiometers whereby each potentiometer is successively caused to produce a control voltage which changes in a linear manner from a first to a second level as the rotors are rotated, a first means coupled to said second potentiometer and said gate pulse generator and responsive to any even pulse of said train of pulses which occurs during said gate pulses for producing a first range pulse at a time subsequent to said even pulse proportional to the angular displacement of the rotor of said second potentiometer, a second means coupled to said third potentiometer and said gate pulse generator and responsive to any odd pulse of said train of pulses which occurs during said gate pulses for producing a second range pulse at a time subsequent to said odd pulse proportional to the angular displacement of the rotor of said third potentiometer, and means for combining the output of said first and second means.

10. The apparatus described in claim 9, wherein as said mechanical interconnecting means is actuated to cause the control voltage produced by one of said second and third potentiometers to change from said first to said second level, the potential produced by the other potentiometer reaches said first level at the time that the potential of the one potentiometer reaches said second level and as the potential of the other potentiometer begins to change from said first level to said second level, the potential of the one potentiometer continues to change beyond said second level for a short time during which said reference pulses are caused to occur at substantially the same time when two pulses of said pulse train occur during a gate pulse.

11. The apparatus described in claim 10 wherein said combining means comprises a blocking oscillator, said blocking oscillator being adapted to produce a final range pulse at the time at which the earlier of said first and second range pulses occur when two pulses of said train occur during a gate pulse.

12. A range pulse generator system comprising a generator for producing a series of starting pulses, a generator responsive to each of said starting pulses for producing a train of equally spaced pulses, a generator responsive to each of said starting pulses for producing a first linear voltage excursion, a first potentiometer, means for producing a first reference voltage proportional to the angular position of the rotor of said first potentiometer, means for comparing said first voltage excursion with said first reference voltage and initiating a gate pulse when the magnitude of said first voltage excursion changes from a magnitude less than to a magnitude more than the magnitude of said reference voltage, said gate pulses being of a duration slightly less than twice the time between the pulses of said train of pulses, means for producing a second linear voltage excursion in response to any even pulse of said train which occurs during said gate pulses, means for producing a third linear voltage excursion in response to any odd pulse of said train which occurs during said gate pulses, said second and third voltage excursions being of a duration slightly greater than the time between the pulses of said train, second and third potentiometers, mechanical means interconnecting the rotors of said second and third potentiometers adapted to cause each potentiometer to successively produce a control voltage which changes in a linear manner from a first to a second level as the rotors are rotated, means for comparing said second and third voltage excursions with the control voltages produced by said second and third potentiometers respectively and producing a range pulse when the magnitude of either voltage excursion changes from a magnitude less than to a magnitude greater than the magnitude of the respective reference voltage, and means for synchronizing the movement of the rotor of said first potentiometer with the movement of the rotors of said second and third potentiometers.

13. A range pulse generator system comprising a generator for producing a series of starting pulses, a generator responsive to each of said starting pulses for producing a train of equally spaced pulses, a generator responsive to each of said starting pulses for producing a first linear voltage excursion, a first potentiometer, means for producing a first reference voltage proportional to the angular position of the rotor of said first potentiometer, means for comparing said first voltage excursion with said first reference voltage and initiating a gate pulse when the magnitude of said first voltage excursion changes from a magnitude less than to a magnitude greater than the magnitude of said reference voltage, said gate pulse being of a duration slightly less than twice the time between the pulses of said train of pulses, a blocking oscillator adapted to be activated by said gate pulse, means for applying said train of pulses to said blocking oscillator, means including said blocking oscillator for producing a second linear voltage excursion in response to any even pulse of said train which occurs during said gate pulses, means including said blocking oscillator producing a third linear voltage excursion in response to any odd pulse of said train which occurs during said gate pulses, said second and third voltage excursions being of a duration slightly greater than the time between the pulses of said train, second and third potentiometers, mechanical means interconnecting the rotors of said second and third potentiometers adapted to cause each potentiometer to successively produce a control voltage which changes in a linear manner from a first to a second level as said rotors are rotated, means for comparing said second and third voltage excursions with the control voltages produced by said second and third potentiometers respectively and producing a range pulse when the magnitude of either voltage excursion exceeds the magnitude of the respective control voltage, and means for synchronizing the movement of the rotor of said first potentiometer with the movement of the rotors of said second and third potentiometers.

14. A pulse generator system comprising a generator for producing a starting pulse, a generator for producing a train of equally spaced pulses, said train of pulses having a predetermined time relation to said starting pulse, a generator for producing a gate pulse at an adjustable predetermined time after said starting pulse, said gate pulse being of a duration slightly greater than the time between the pulses of said train, a first adjustable reference pulse generator means coupled to said gate pulse and pulse train generators for producing a reference pulse at a first predetermined time interval after each even pulse of said train which occurs during said gate pulse, a second adjustable reference pulse generator means coupled to said gate pulse and pulse train generators for producing a reference pulse at a second predetermined time interval after each odd pulse of said train which occurs during said gate pulse, means coupling said first and second adjustable reference pulse generator means together to maintain a substantially constant difference between said first and second time intervals, said difference being substantially equal to the time between pulses of said train, and means for adjusting said reference pulse generator means simultaneously to make said reference pulses occur at substantially the same time when two pulses of said train occur during said gate pulse, and means responsive to the outputs of said first and second adjustable means to produce a range marking pulse.

15. In combination, a generator for producing a series of starting pulses, a transmitter adapted to radiate a pulse of electromagnetic energy in response to each of said starting pulses, a receiver adapted to receive reflected portions of said pulses of electromagnetic energy, an adjustable control device coupled to said generator for producing a gate pulse at an adjustable delayed time after each of said starting pulses, means for producing a train of equally spaced pulses, said pulse train having a predetermined time relation to said starting pulses and the period between the pulses in said pulse train being shorter than said gate pulses but more than half as long, first and second adjustable sources of potential, movable means adapted to successively and repeatedly change the potential produced by each of said adjustable sources of potential from a first to a second level in a gradual manner as said movable means is displaced, first means coupled to said first adjustable source of potential and said control device and responsive to any even pulse of said pulse train which occurs during said gate pulses for producing a reference pulse after a time interval subsequent to said even pulse proportional to the potential produced by said first adjustable source of potential, second means coupled to said second adjustable source of potential and said control device and responsive to any odd pulse of said pulse train which occurs during said gate pulses for producing a reference pulse after a time interval subsequent to said odd pulse proportional to the potential produced by said second adjustable source of potential, means for combining the output of said first and second means, and means for comparing the time at which said reference pulses occur with the time at which reflected portions of said pulses of electromagnetic energy are received by said receiver.

16. The apparatus described in claim 15, wherein as said movable means is displaced to cause the potential of one adjustable source to change from said first to said second level, the potential of the other adjustable source reaches said first level at the time that the potential of the one adjustable source reaches said second level and as the potential of other adjustable source begins to change from said first level to said second level, the potential of the one adjustable source continues to change beyond said second level for a short time during which said reference pulses are caused to occur at substantially the same time when two pulses of said pulse train occur during a gate pulse.

17. The apparatus described in claim 16, wherein said adjustable control device is coupled to and adjusted simultaneously with said movable means.

18. The apparatus described in claim 17, wherein said adjustable control device comprises a generator coupled to said starting pulse generator for producing a voltage excursion in response to each of said starting pulses, a third adjustable source of potential, and means for comparing said voltage excursion with the voltage of said third source of potential and initiating said gate pulse when the voltage excursion changes from a magnitude less than to a magnitude more than the voltage of said third source.

19. In combination, a generator for producing a series of starting pulses, a transmitter adapted to radiate a pulse of electromagnetic energy in response to each of said starting pulses, a receiver adapted to receive reflected portions of said pulses of electromagnetic energy, an adjustable control device coupled to said generator for producing a gate pulse at an adjustable delayed time after each of said starting pulses, means for producing a train of equally spaced pulses, said pulse train having a predetermined time relation to said starting pulses and the period between the pulses in said pulse train being shorter than said gate pulses but more than half as long, first and second adjustable sources of potential, rotatable means adapted to successively change the potential produced by each adjustable source of potential from a first to a second level in a linear manner as said means is rotated, said rotatable means being staggered whereby as the potential of one source is changed from said first to said second level the potential of the other source is changed during a small portion of the initial and final portion of the rotation, first generating means coupled to said first adjustable source of potential and said gate pulse generator and responsive to any even pulse of said pulse train which occurs during said gate pulses for producing a reference pulse after a time interval subsequent to said even pulse proportional to the potential produced by said first adjustable source of potential, second generating means coupled to said second adjustable source of potential and said gate pulse generator and responsive to any odd pulse of said pulse train which occurs during said gate pulses for producing a reference pulse after a time interval subsequent to said odd pulse proportional to the potential produced by said second adjustable source of potential, means for combining the output of said first and second generating means, and means for comparing the time at which said reference pulses occur with the time at which reflected portions of said pulses of electromagnetic energy are received by said receiver.

20. The combination of claim 19 wherein said adjustable control device is coupled to and adjusted simultaneously with said rotatable means.

21. In combination, a generator for producing a series of starting pulses, a transmitter adapted to radiate a pulse of electromagnetic energy in response to each of said starting pulses, a receiver adapted to receive portions of said pulses of electromagnetic energy, a generator for producing a train of equally spaced pulses, said train of pulses having a predetermined time relation to said starting pulses, a generator responsive to said starting pulses for producing a gate pulse at an adjustable predetermined time after each of said starting pulses, said gate pulses being of a duration slightly less than twice the time between the pulses of said train, a first range pulse generator means coupled to said gate pulse and pulse train generators for producing a range pulse at a first adjustable time interval after each even pulse of said train which occurs during said gate pulses, a second range pulse generator means coupled to said gate pulse and pulse train generators for producing a range pulse at a second adjustable time interval after each odd pulse of said train which occurs during said gate pulses, means for adjusting said first and second range pulse generator means simultaneously and maintaining a substantially constant difference between said first and second intervals, said difference being substantially equal to the repetition period of said equally spaced pulses in said train whereby said range pulses are produced at substantially the same time when two pulses of said train occur during a gate pulse, and means for comparing the time at which said range pulses occur with the time at which portions of said pulses of electromagnetic energy are received by said receiver.

22. The combination of claim 21, wherein said generator for producing gate pulses is adapted to be adjusted simultaneously with said first and second adjustable means.

23. In combination, a generator for producing a series of starting pulses, a transmitter adapted to radiate a pulse of electromagnetic energy in response to each of said starting pulses, a receiver adapted to receive portions of said pulses of electromagnetic energy, a generator responsive to said starting pulses for producing a train of equally spaced pulses, said train of pulses having a predetermined time relation to said starting pulses, a generator responsive to said starting pulses for producing a gate pulse at an adjustable time interval after each of said starting pulses, said gate pulses being of a duration slightly less than twice the time between the pulses of said train of pulses, first and second adjustable sources of potential, moveable means for successively and repeatedly changing said sources of potential from a first to a second level in a gradual manner as said moveable means is displaced, means coupled to said first adjustable sources of potential and said gate pulse generator and responsive to any even pulse of said train of pulses which occurs during said gate pulses for producing a first range pulse after a time interval subsequent to said even pulse proportional to the voltage produced by said first adjustable source of potential, means coupled to said second adjustable source of potential and said gate pulse generator and responsive to any odd pulse of said train of pulses which occurs during said gate pulses for producing a second range pulse after a time interval subsequent to said odd pulse proportional to the voltage produced by said second adjustable source of potential, said means for successively changing said second and third adjustable sources of potential being adapted to cause said first and second range pulses to occur at substantially the same time when two pulses of said train of pulses occur during a gate pulse, and means for comparing the time at which said final range pulse occurs with the time at which reflected pulses of electromagnetic energy are received by said receiver.

24. In combination, a generator for producing a series of starting pulses, a transmitter adapted to radiate a pulse of electromagnetic energy in response to each of said starting pulses, a receiver adapted to receive portions of said pulses of electromagnetic energy, a generator responsive to each of said starting pulses for producing a train of equally spaced pulses, a first source of potential, a first potentiometer coupled to said source of potential and adapted to produce a first control voltage linearly proportional to the angular displacement of the rotor of said potentiometer, a generator adapted to produce a gate pulse at a time subsequent to each of said starting pulses proportional to the magnitude of said first control voltage, said gate pulses being of a duration slightly less than twice the time between the pulses of said pulse train, second and third sources of potential, second and third potentiometers coupled to said second and third sources of potential, mechanical means interconnecting the rotors of said second and third potentiometers whereby each potentiometer is successively caused to produce a control voltage which changes in a linear manner from a first to a second level as the rotors are rotated, a first means coupled to said second potentiometer and said gate pulse generator and responsive to any even pulse of said train of pulses which occurs during said gate pulses for producing a first range pulse at a time subsequent to said even pulse proportional to the angular displacement of the rotor of said second potentiometer, a second means coupled to said third potentiometer and said gate pulse generator and responsive to any odd pulse of said train of pulses which occurs during said gate pulses for producing a second range pulse at a time subequent to said odd pulse proportional to the angular displacement of the rotor of said third potentiometer, and means for comparing the time at which said range pulses occur with the time at which reflected pulses of electromagnetic energy are received by said receiver.

25. The apparatus described in claim 24, wherein as said mechanical interconnecting means is actuated to cause the control voltage produced by one of said second and third potentiometers to change from said first to said second level, the potential produced by the other potentiometer reaches said first level at the time that the potential of the one potentiometer reaches said second level and as the potential of the other potentiometer begins to change from said first level to said second level, the potential of the one potentiometer continues to change beyond said second level for a short time during which said reference pulses are caused to occur at substantially the same time when two pulses of said pulse train occur during a gate pulse.

26. In combination, a generator for producing a series of starting pulses, a transmitter adapted to radiate a pulse of electromagnetic energy in response to each of said starting pulses, a receiver adapted to receive reflected portions of said pulses of electromagnetic energy, a generator responsive to each of said starting pulses for producing a train of equally spaced pulses, a generator responsive to each of said starting pulses for producing a first linear voltage excursion, a first potentiometer, means for producing a first reference voltage linearly proportional to the angular position of the rotor of said first potentiometer, means for comparing said first voltage excursion with said first reference voltage and initiating a gate pulse when the magnitude of said first voltage excursion changes from a magnitude less than to a magnitude greater than the magnitude of said reference voltage, said gate pulse being of a duration slightly less than twice the time between the pulses of said train of pulses, means for producing a second linear voltage excursion in response to any even pulse of said train which occurs during said gate pulses, means for producing a third linear voltage excursion in response to any odd pulse of said train which occurs during said gate pulses, said second and third voltage excursions being of a duration slightly greater than the time between the pulses of said train, second and third potentiometers, mechanical means interconnecting the rotors of said second and third potentiometers adapted to cause each potentiometer to successively produce a control voltage which changes in a linear manner from a first to a second level as the rotors are rotated, means for comparing said second and third voltage excursions with the control voltages produced by said second and third potentiometers respectively and producing a range pulse when the magnitude of either voltage excursion changes from a magnitude less than to a magnitude greater than the magnitude of the respective reference voltage, means for mechanically interconnecting the rotors of said second and third potentiometers with the rotor of said first potentiometer, and means for comparing the time at which said range pulses occur with the time at which reflected pulses of electromagnetic energy are received by said receiver.

References Cited in the file of this patent

UNITED STATES PATENTS

| | | |
|---|---|---|
| 2,250,708 | Herz | July 29, 1941 |
| 2,359,447 | Seeley | Oct. 3, 1944 |
| 2,373,145 | Sensiper | Apr. 10, 1945 |
| 2,422,204 | Meacham | June 17, 1947 |
| 2,466,044 | Schoenfeld | Apr. 5, 1949 |
| 2,491,029 | Brunn | Dec. 13, 1949 |